Dec. 25, 1951   J. SUNNEN   2,580,329
INSERT HOLDER
Filed March 31, 1949   3 Sheets-Sheet 1
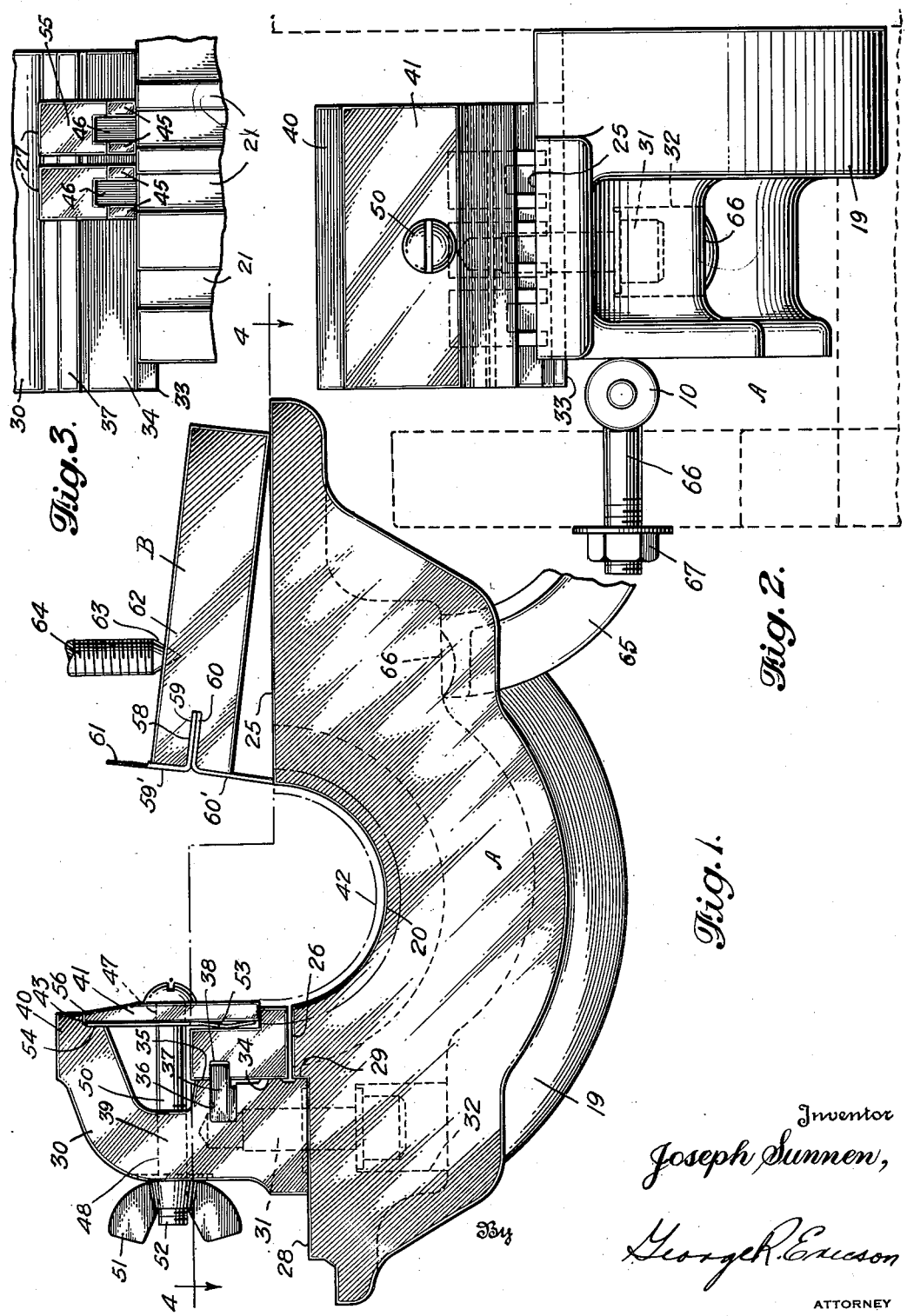
Inventor
Joseph Sunnen,
By
George R. Ericson
ATTORNEY

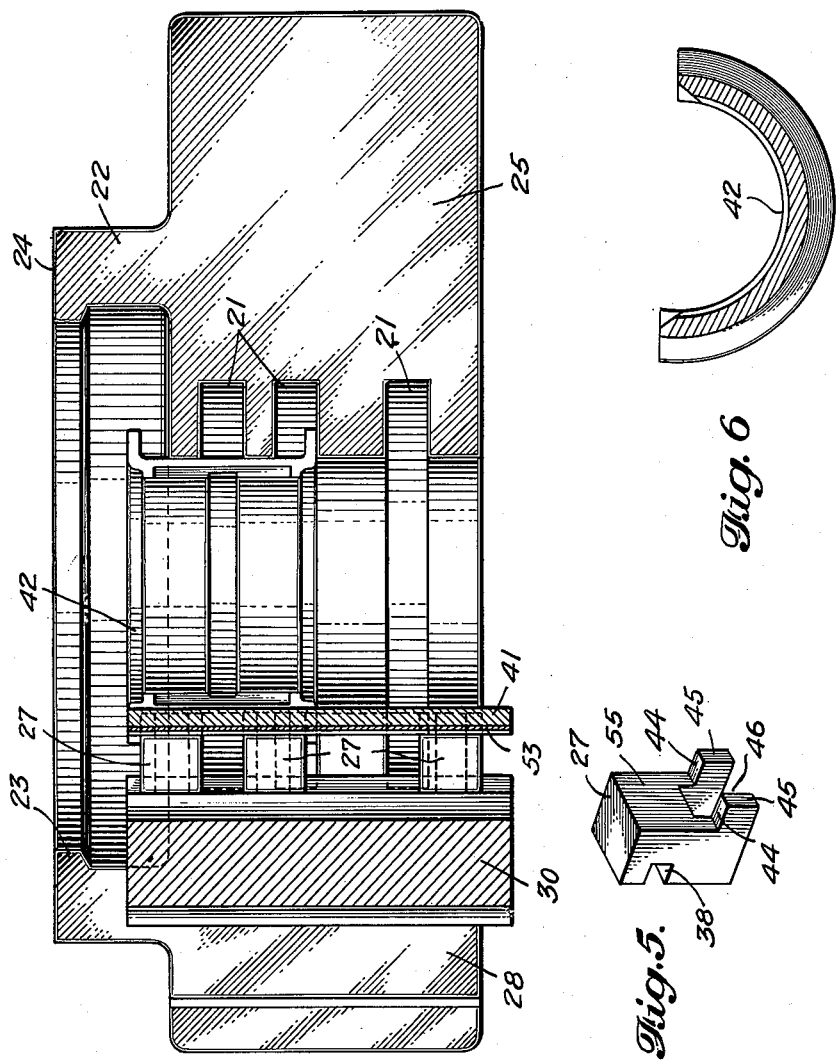

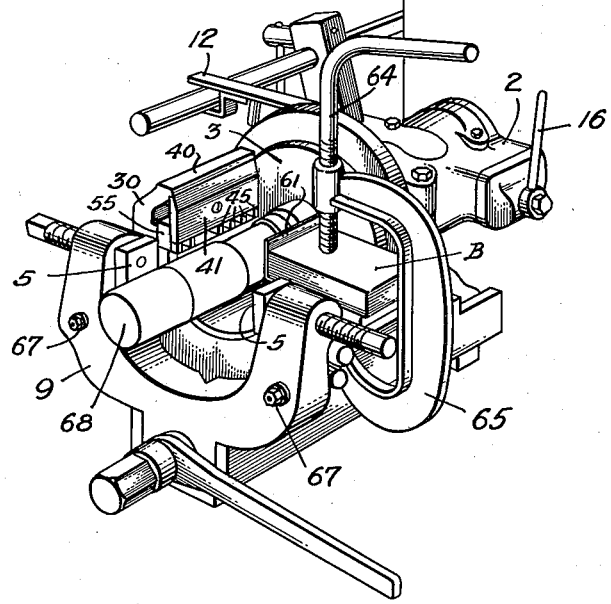
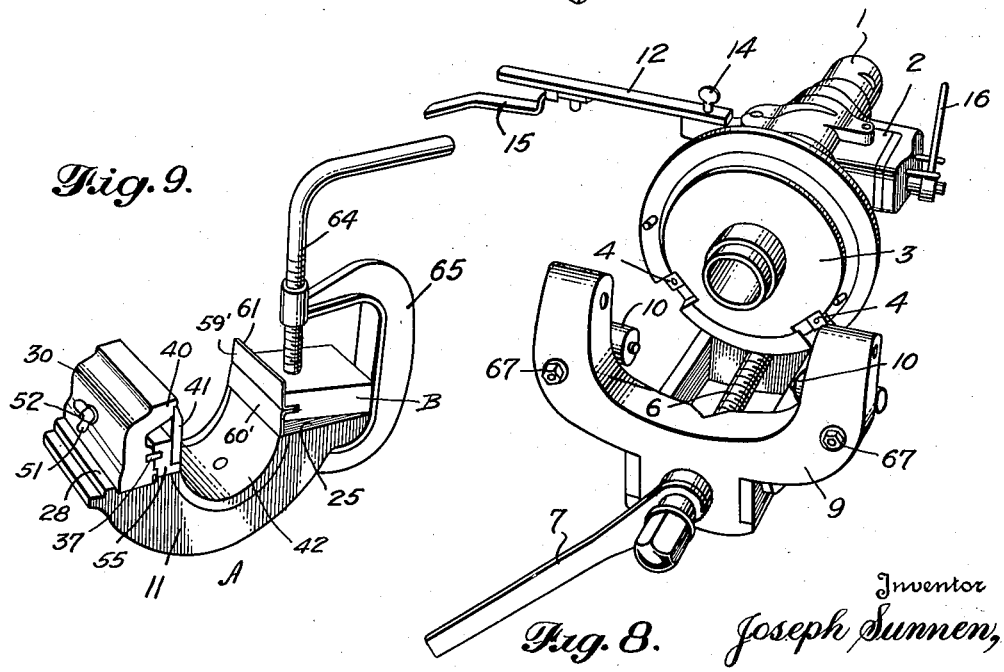

Patented Dec. 25, 1951

2,580,329

UNITED STATES PATENT OFFICE 2,580,329

INSERT HOLDER

Joseph Sunnen, Clayton, Mo.

Application March 31, 1949, Serial No. 84,558

12 Claims. (Cl. 77—63)

This invention relates to improvement in insert holders designed to clamp inserts to a backing structure whereby proper rigidity and alignment is provided to permit an accurate boring operation to reduce the same to predetermined concentric or eccentric dimensions.

The main object of the present invention is to provide an insert holder for use and association with a boring machine or a honing machine using a fixed type abrasive whereby such machines may be utilized in the precision sizing of bearings or inserts, regardless of the nature of the machining required to bring the same to the required dimensions.

Another object of the invention is to provide an insert holder of such construction that it may be readily attached to the conventional boring or honing machine for either eccentric or concentric operation to machine an insert or bearing regardless of its size or construction, it being well known in the art that inserts are of many different sizes and shapes to include flanges, lugs, or projections which must be accommodated during a boring operation without interfering with any micro-adjustment required to produce the necessary dimensions.

A further object of the invention is to provide an insert holder, which itself may be machined to close production tolerances, for association with a boring or honing machine so that the device may be permanently prepared for convenient attachment for producing extremely accurate measurements.

Other features reside in the provision of an insert holder in which a pre-designed concave surface is provided with a multiplicity of variably arranged arcuate slots in which may be located lugs and projections on the insert to be machined, the arcuate slots being so constructed and arranged that an insert may be readily and conveniently positioned and clamped to provide the maximum solid backing essential to prevent distortion during the boring operation; the use of a plurality of shiftable blocks mounted for longitudinal sliding relative movement to permit their association with proper portions of an insert whereby the marginal portions of the insert are properly backed; and the use of novel clamping means for engaging the transverse end portions of the insert when positioned in the block so as to urge the insert into firm association with its backing surface, these clamps being so constructed and arranged as to properly engage a suitable part of the inserts regardless of their form and construction.

Other objects of this invention will more clearly hereinafter appear by reference to the accompanying drawings and specification wherein like characters of reference designate corresponding parts throughout the several views, in which:

Fig. 1 is an end elevation shown the parts in position;

Fig. 2 is a side elevation with the yoke clamp indicated in dotted line;

Fig. 3 is a top plan view with the block extension removed, showing the slide blocks and their association with a fragmentary disclosure of the main casting;

Fig. 4 is a top plan view with the main casting extension shown in section;

Fig. 5 is a perspective view of one of the movable blocks;

Fig. 6 is a transverse section of one form of insert or bearing;

Fig. 7 is a perspective view showing the device assembled with the end portion of a boring machine;

Fig. 8 is a similar view showing the insert holder removed; and

Fig. 9 is a perspective view of the insert holder showing the C-clamp in position.

The present invention is designed for use in connection with boring and honing machines of the general type shown in my prior Patents No. 2,349,526 and No. 2,350,081, the insert holder as a unit being indicated generally by the reference character A and its association with the machine of the type above noted being best illustrated in Figs. 7 and 8, in which figures reference character 1 indicates the spindle sleeve which chucks in the spindle of the boring or honing machine and supports the carriage 2 and rotates the boring bar. The face plate is indicated by reference character 3 and is accurately ground at right angles with the bore of the carriage 2. The face plate 3 is provided with the insert holder locators 4 which are designed to position the insert holder and functions to provide an adjustment whereby the bore of the bearing may be either concentric or eccentric as desired. The rod clamping blocks bearing the reference character 5 are not used in conjunction with the present bearing sizer but are adaptable primarily in connection with the clamping of rod forgings and are adjusted by fast acting screws mounted in the yoke clamp 9. As best shown in Fig. 7, the yoke clamp 9 is adjusted by the clamp screw 6, which latter is provided with the usual lock-up lever 7 which secures the adjustment after the fast acting clamp 9 has been properly positioned with the clamping rollers 10 locked against the face 11 of the insert holder A. A torque arm 12 is illustrated in the assembly, being fastened by the thumb screw 14 and having the torque arm latch 15, as best illustrated in Fig. 8. The torque arm stabilizes and guides the carriage 2. The feed lever for the machine is illustrated at 16; this feed lever automatically controls the operation of the carriage 2. When the feed lever 16 is engaged, the carriage 2 automatically travels back along the spindle 1 feeding the work across the cutter. As is usual in such structures a stroking stop is utilized to trip the feed lever and stop the carriage.

Referring now to Figs. 1 to 6, inclusive, the insert holder is illustrated as including a main casting formed with an arcuate recess medially of its upper face as illustrated by reference character 20. It is intended where the instant invention is to be of general use in a shop for sizing bearings of different dimensions, including bearings of different types with modifications of flanges and projections, that a plurality of castings 19 will be provided, it being obvious to one skilled in the art that the arcuate seat 20 will not be capable of accommodating all bearings, inasmuch as the bearings such as illustrated in Fig. 6 must necessarily have a firm backing and thus the block must present a contour approximating a particular bearing size. Each of the castings 19 forming the main body of the insert holder will be provided with substantially the same general arrangement of arcuate recesses or grooves 21, these grooves or recesses being relatively spaced longitudinally to provide for the accommodation of a maximum number and type of bearings. The slots 21 may be of any desired number and will be of such transverse dimensions and so longitudinally spaced as to receive lugs, projections and flanges, or combination of lugs and flanges, found in any standard type of bearing insert. In the present illustration only three arcuate grooves or recesses 21 are illustrated, however, it is intended that this number may be increased to conform to requirements of the trade and when the number of slots is increased their relative longitudinal position and dimension will be determined by the work which is to be accommodated by the structure. The casting 19 includes the rearwardly projecting semi-circular neck 22 formed with the inwardly projecting flange 23, and the outer flat face 24 which is to be associated with the face plate 3 of the assembly of Figs. 7 and 8. The casting 19 is substantially semi-circular, having a flat upper face 25, which lies in a plane at the diameter of the structure, and the flattened face 26 lying in a plane slightly below the plane of the face 25 which provides a seat for the removable sliding blocks 27 shown in Fig. 5 and hereinafter more fully described. Outwardly of the face 26 the casting 19 is stepped downwardly to provide a flat face 28 defined by the vertical longitudinally extending shoulder 29, and upon which is arranged the separable body extension 30, the latter having a lower face which seats on the table 28 at such a position that its lower inner marginal edge will engage the guide shoulder 29. The separable body extension 30 or stop is secured in position by any suitable means such as the stud 31 which projects upwardly from the recess 32 through the main casting 19 and into the extension 30 where a recessed threaded socket may be provided to receive the same.

The removable body section 30 is preferably of slightly greater length than the main body casting 19 to extend beyond the same as at 33 as shown in Fig. 2 to provide an extended area for receiving relatively wider inserts. The inner lower upright face of the body extension 30 lies in substantially the same vertical plane as the wall 29 forming the shoulder heretofore mentioned and is provided with two longitudinal guide faces 34 and 35 spaced apart at each side of a longitudinal recess 36 in which is clamped a hardened metal guide bar 37, this bar projecting outwardly from the inner lower face of the body extension 30 to provide a guideway for receiving the movable blocks 27, which latter are formed at their outer faces with longitudinal slots 38 as better shown in Fig. 5. The body extension 30 includes a medial neck portion 39 and an inwardly projecting extension 40, this extension 40 projecting inwardly a sufficient distance to provide for the reception of a stop blade 41, which latter cooperates with the sliding blocks 27 to position and bind the inserts, such as shown at 42 in dotted line in Fig. 1 and illustrated in vertical section in Fig. 6.

The extension 40 of the removable body section 30 of the assembly is cut away at its lower marginal edge to provide a recess defined by a shoulder 43 for receiving one end of the stop blade 41. The lower end of the stop blade rests upon the upper faces 44 of the spaced projections 45 formed at the lower inner edge of the movable blocks 27. It will be noted by reference to Fig. 5 that a medial transverse slot 46 is formed at the bottom of the block 27, and the width of this slot may approximate the width of the widest of the arcuate grooves 21 formed in the main casting 19. The slot 46 forms in substance and during assembly a continuation of the arcuate slots 21 and further operates to space and define the inwardly projecting shoulders 45 upon the upper faces of which the stop blade 41 seats. The stop blade 41 is formed with a transverse bore 47 which is aligned with a bore 48 in the extension 30 and a bolt 50 extends through these parts to clamp the stop blade 41 into position, the clamping action being brought about by the thumb screw 51 on the threaded end 52 of the bolt 50. In order that the blocks 27 may, without undesirable displacement, be longitudinally shifted and relatively positioned on their guide 38, a plate spring 53 is interposed between the stop blade 41 and the surfaces against which it is drawn by tightening of the thumb screw 51 on the bolt 50, these faces as shown in Fig. 1 including portion 54 of the inner extension 40 of the removable body section 30 and the vertical faces 55 of such movable blocks 27. It will be noted that the stop blade 41 is formed with one beveled edge 56, the purpose of which will be hereinafter set forth.

For clamping the other upper longitudinal marginal edge of the insert into the block or casting, there is provided a clamp block indicated generally by the reference character B. This clamp block is of any suitable width and thickness to form a properly associated part for the general structure, and is recessed longitudinally at one end as shown at 58 to receive the inner ends of the steel plates 59 and 60, the inner ends of these plates 59 and 60 being secured in place by any suitable means to insure their permanent association with the assembly. The plates 59 and 60 are bent in opposite directions against the adjacent end portions of the block B as shown at 59' and 60' and extend beyond the side faces of the block B a suitable distance so that in use the block B will lie at an acute angle with respect to the upper face 25 of the casting 19 as shown in Fig. 1. This arrangement obviously provides an inherent resiliency in the structure desirable in performing the clamping function for which it is designed. The projecting portion 59' of the steel blade 59 is reduced in thickness at 61 to provide a more limited area for engaging the upper edge portion of the insert 42 for reasons which will more clearly hereinafter appear. The upper face of the block B is formed with a recess 62 to receive the tapered end 63 of the threaded element 64 of the clamp 65, shown more clearly in Figs. 7 and 9, the opposite end of the C-clamp engaging the flattened shoulder portion 66 of the casting 19 at a point in vertical alignment with the recess 62 whereby direct clamping action may be had upon the block B and the engaging plates 59' and 60'.

In use of the device it is desirable that an insert holder be selected most closely approximating the outer diameter of the insert which is to be sized. While the insert holder need not be the exact size of the bearing or insert it is preferable that the closest approximation be provided, it being remembered that substantially all inserts are capable of a spread, as measured across the parting line, greater than the outer diameter. The selection of the insert holder is to insure a snug fit in the rod or block in which it is to be assembled and such a fit is not prevented by a slight differential between the insert holder and insert as long as the spread of the insert is not exceeded. The important feature about the selection of the insert holder for use in a particular job is to insure the firm seating of the insert against the insert holder when the insert is clamped in position for the boring operation. The insert is first placed loosely in the annular recess 20 of the holder A with the locking lug of the insert on the left side in a position to take the best advantage of the supporting rib or flange 23 of the insert holder. With the insert thus loosely positioned the thumb screw 50 is loosened by turning the nut 51 and by a suitable tool, the blocks 27 positioned to clear the bearing or insert locking lugs. The tightening of the thumb screw may now be proceeded with and at the same time the operator may manually press the insert or bearing section into position with his fingers, being sure that the left side of the insert be positioned against the bottom edge of the stop blade 41. At this time the clamping block B is positioned on the right side of the insert holder in the position indicated in Fig. 1, the block being utilized in such a manner as to select the proper thickness of plates 59 and 60 according to the thickness of the bearing, the selected plate being placed against the upper marginal edge of the insert and pulled down tightly by means of the C-clamp 65, it being necessary to position the parts so that the clamping blade will not interfere with the cutters. The same is true in connection with the selection of the stop blade 41, for as previously stated, this blade is provided with marginal clamping edges of different thicknesses to accommodate different types of bearings under different circumstances.

When the proper insert holder has been selected and the insert clamped, the holder is positioned with the locators 4 at zero (0) or in the event eccentric boring is desired, these locators 4 will be suitably adjusted. With the locators properly positioned in the event eccentric boring is required, or at zero in the event concentric boring is desired, the clamp 9 is opened wide enough to accommodate the insert holder, first however backing off the clamping blocks indicated by reference character 5, which clamping blocks are not used in the present operation. The insert holder is positioned against the face plate 3 and against the locators 4 and while in this position the clamp 9 is moved into engaging position by hand until the clamp rollers 10 are firmly against the adjacent outer face of the insert holder. With the parts so positioned any suitable tool may be positioned under the insert holder and across the yoke of the clamp and used as a pry bar so that the insert holder will be secured tightly against the locator while the clamp 9 is tightened with the lock lever 7.

In using the present equipment with the structure of Patents No. 2,349,526 and No. 2,350,081 heretofore mentioned, it will be necessary to slightly modify the machine structure as by providing the same with the clamp rollers 10. It will be noted that these clamp rollers 10 are fixed to the arms of the yoke of the clamp 9 by bolts 66 which extend through openings provided in the yoke arms and nuts 67 suitably lock the clamp rollers in position. The arrangement of these parts is illustrated in Fig. 2.

In Fig. 7 there is indicated by reference character 68 a structure which may be either a centralizer, such as shown in my Patent No. 2,350,081, which is used to position the parts with respect to the central line of the spindle sleeve, or it may indicate a suitable boring bar, which latter would essentially include a cutter in which adjustment would be provided by the micrometer dial and foot pedal of the honing machine in the patents mentioned above.

With the boring insert positioned in the boring machine as heretofore mentioned, the micrometer dial on the honing machine would be adjusted to secure a direct reading so that a setting of .001 on the dial will remove .001 from the thickness of the insert. It is desirable that an initial cut or cuts be made to a sufficient depth to completely clean the insert. After the insert has been properly cleaned it will be removed and by use of a suitable gauge pin the overall thickness of the insert and the pin will be determined. With the micrometer reading of the thickness of the insert thus obtained, the thickness of the insert at the crown and near the parting line of the bearing should be determined to be sure the locating procedure has been correct, as it may be possible that a chip, burr, or dirt could be present and in this event the insert and holders should be relocated. Having calculated in accordance with the foregoing procedure, the desired thickness may be subtracted from the actual measured thickness of the bearing to determine the amount of stock to be removed to bring the insert to the desired size. Having determined the amount of the insert to be removed the insert is reclamped in the holder and the micrometer dial which shifts the cutter is adjusted to remove the required amount of stock. It is preferable that more than one cut be made if any substantial amount of stock is to be removed to secure the desired finish. With the desired thickness thus obtained the finished cut which will be provided for at the initial dial setting may be made.

From the foregoing it will be obvious to one skilled in the art that a structure has been provided for holding inserts or bearing sections so that a solid backing is provided which will prevent any clamp distortion of the insert which would result in an inaccurate machining to desired dimensions. This result is accomplished by a novel multiple arrangement of grooves which accommodates all types of bearings, including flanged or lug bearings or bearings having a combination of flanges and lugs, and by associating with such a multiple grooved holder movable blocks which can be positioned to accommodate all combinations of such flanges and lugs. The structure is relatively simple and permits a simplified clamping action whereby one insert holder may be substituted for another, it being noted that the insert holding casting will, in a majority of instances, accommodate all of the accessories and attachments going with the casting to provide the desired equipment.

What I claim is:

1. An insert holder for receiving and backing inserts to be machined, said holder including a body member formed with an arcuate recess to receive insert members, block members arranged for longitudinal adjustment along one marginal edge of said recess, said blocks having their inner faces shaped to form a continuation of the arcuate recess in the body member, a rear guide element including a guide bar for said blocks secured to said body member at one side of said recess, blade means between said blocks and said rear guide element for maintaining said blocks in a common plane, said blade member having one edge engaging said guide element and abutting inner face portions of said blocks and securing said blocks in adjusted position against said guide, and a clamping block including a rigid body and a resilient clamping blade carried by said body member at the other side of said recess engaging the upper edge portions of the insert and binding the insert into said recess in the body member.

2. An insert holder for receiving and backing inserts to be machined, said holder including a body member formed with an arcuate recess to receive insert members, block members arranged for longitudinal adjustment along one marginal edge of said recess, said blocks having their inner faces shaped to form a continuation of the arcuate recess in the body member and their rear faces formed with transverse slots, a rear guide element for said blocks secured to said body member at one side of said recess and including a horizontally positioned rigid guide projection for seating in the transverse slots in said blocks, a blade member having one edge engaging said guide, said blade member abutting inner face portions of said blocks and securing said blocks in adjusted position against said guide, and means carried by said body member at the other side of said recess for engaging the upper edge portions of the insert and binding the insert into said recess in the body member.

3. An insert holder for receiving and backing inserts to be machined, said holder including a body member formed with an arcuate recess to receive insert members, block members of L-shaped form arranged for longitudinal adjustment along one marginal edge of said recess, said blocks having their inner faces shaped to form a continuation of the arcuate recess in the body member, a rear guide element for said blocks removably secured to said body member at one side of said recess, said guide element including a downwardly facing shoulder, a blade member having one edge engaging said shoulder, said blade member abutting inner face portions of said blocks and securing said blocks in adjusted position against said guide, means for adjusting said blade member against said blocks and securing said blade member to said guide element, resilient means interposed between said blade member and said blocks, and adjustable means carried by said body member at the other side of said recess for engaging the upper edge portions of the insert and binding the insert into said recess in the body member.

4. An insert holder for receiving and backing inserts to be machined, said holder including a body member formed with an arcuate recess to receive insert members, the wall defining said arcuate recess having one longitudinal edge lying in a horizontal plane substantially below the horizontal plane of the other longitudinal edge, a backing wall formed at the rear of the lower marginal edge, block members arranged for longitudinal adjustment along the lower marginal edge of the recess and having inner face portions with a contour forming a continuation of the wall of the arcuate recess, said blocks being provided with inner facing shoulders lying in a common plane, a blade member seating against said block members above the shoulders and engaging an upper portion of said backing wall, and means for adjustably positioning said blade member against said blocks and said backing member.

5. An insert holder for receiving and backing inserts to be machined, said holder including a body member formed with an arcuate recess to receive insert members, the wall defining said arcuate recess having one longitudinal edge lying in a horizontal plane substantially below the horizontal plane of the other longitudinal edge, a backing wall formed at the rear of the lower marginal edge, block members arranged for longitudinal adjustment along the lower marginal edge of the recess and having inner face portions with a contour forming a continuation of the wall of the arcuate recess, said blocks being provided with inner facing shoulders lying in a common plane, a blade member seating against said block members above the shoulders and engaging an upper portion of said backing wall, means for adjustably positioning said blade member against said blocks and said backing member, and resilient means interposed between the blade and block members for frictionally retaining said block members in adjusted position upon release of said blade member.

6. In an insert holder for positioning inserts to be machined, including a body member, a transverse arcuate recess formed medially of the upper face of said body member, relatively flat portions formed at the upper face of the body member and at each side of said recess, slidable blocks formed with aligned slots arranged on one of the flat portions, said block members having inwardly extending projections provided with inner faces shaped to form a continuation of the face of the arcuate recess, a projecting portion extending upwardly from the body member outwardly of said blocks and forming a backing element for the outer face of the latter, a guide bar carried by said projecting portion and seating in said aligned slots for retaining said blocks against vertical displacement, a stop blade for holding the block members against said projecting portion, and means for adjusting said stop blade.

7. In an insert holder for positioning inserts to be machined, including a body member formed with a transverse arcuate recess medially of its upper face, said recess having a plurality of spaced transverse supporting ribs, relatively flat portions formed at the upper face of the body member at each side of the recess, a separable stop block positioned at one side of the recess and spaced from the longitudinal marginal edge thereof, slidable blocks arranged along the marginal edge of said recess and having their outer faces abutting said stop block, said slidable blocks including spaced inwardly extending projections adapted to register with said ribs, plate means detachably secured to said separable stop block for retaining said slidable blocks against the separable stop block and limiting the movement of the insert in the holder on its axis when in said recess, an additional plate means for engaging the opposite marginal edge of the insert to urge the same against the first-named plate means, and detachable means for applying pressure to the last-named plate means.

8. The substance of claim 7 characterized in that the separable stop block is provided with a longitudinally extending rib which is engaged by slots formed in the slidable blocks, whereby the latter are shiftable along said rib.

9. The substance of claim 7 characterized in that the plate means detachably secured to the stop block resiliently engages the sliding blocks to prevent the latter from being displaced during adjustment.

10. In an insert holder for positioning inserts to be machined, a body member formed with a transverse arcuate recess for receiving the inserts, the chord of the arc of the recess being less than the diameter of a circle of which the arc is a segment, whereby semi-circular inserts positioned in the arcuate recess will extend above the face of the body member, shiftable blocks supported by the body member for backing the rear projecting face of the insert in the recess, and means for locking the shiftable blocks in adjusted position along the longitudinal edge of the arcuate recess.

11. The substance of claim 10 characterized in that a stop is fixed to the body member at one side of the arcuate recess to provide a backing for the shiftable blocks.

12. An insert holder for receiving flanged inserts to be machined, said holder including a body member formed with an insert receiving recess of arcuate form, spaced parallel flange receiving channels of relatively different widths formed transversely in the face of said recess, longitudinally adjustable blocks carried by the body member at one side of the recess for engaging the longitudinal marginal edge portions of an insert positioned in said recess, said blocks being formed with notches for adjustable cooperation with said channels, and means for securing said blocks against lateral and vertical displacement.

JOSEPH SUNNEN.

REFERENCES CITED

The following references are of record in the file of this patent:

UNITED STATES PATENTS

| Number | Name | Date |
| --- | --- | --- |
| 1,558,045 | Robertson et al. | Oct. 20, 1925 |
| 1,596,525 | Green | Aug. 17, 1926 |
| 1,685,224 | Blomstrom | Sept. 25, 1926 |
| 2,349,526 | Sunnen | May 23, 1944 |